Jan. 30, 1951 P. J. HERBST 2,539,905
AIR NAVIGATION
Filed Dec. 21, 1946 3 Sheets-Sheet 1
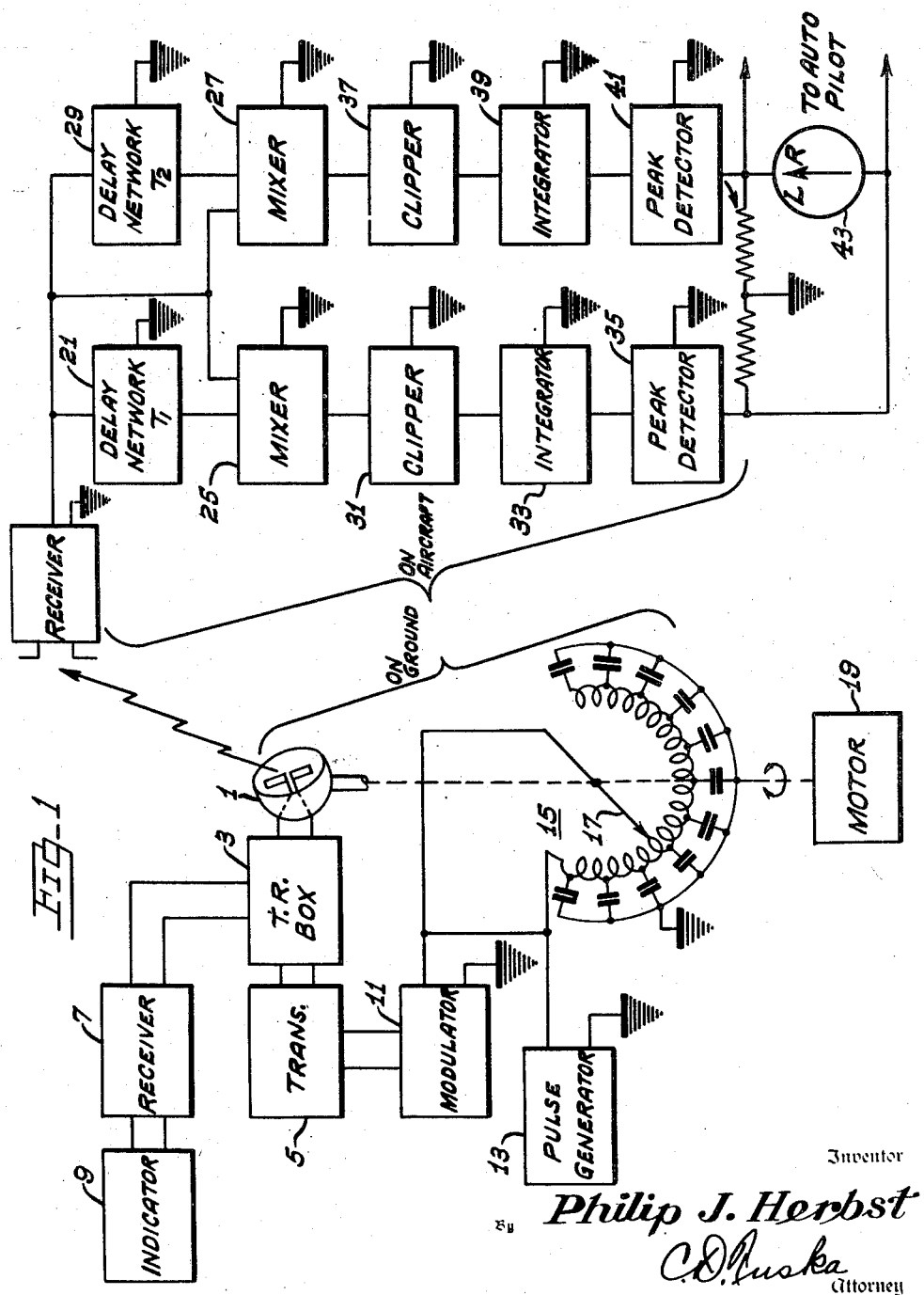
Inventor
Philip J. Herbst
By
C. D. Ruska
Attorney Jan. 30, 1951 P. J. HERBST 2,539,905
AIR NAVIGATION
Filed Dec. 21, 1946 3 Sheets-Sheet 2
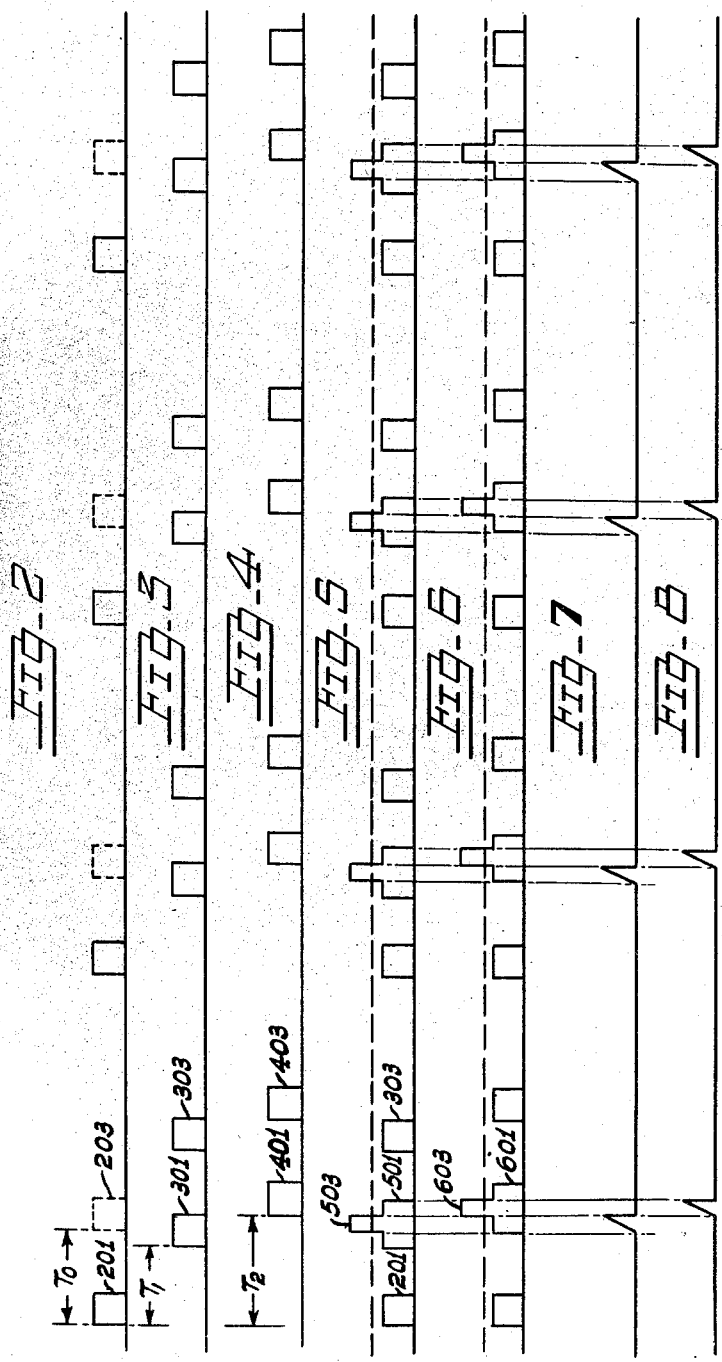
Inventor
Philip J. Herbst
By
C. D. Cuska
Attorney

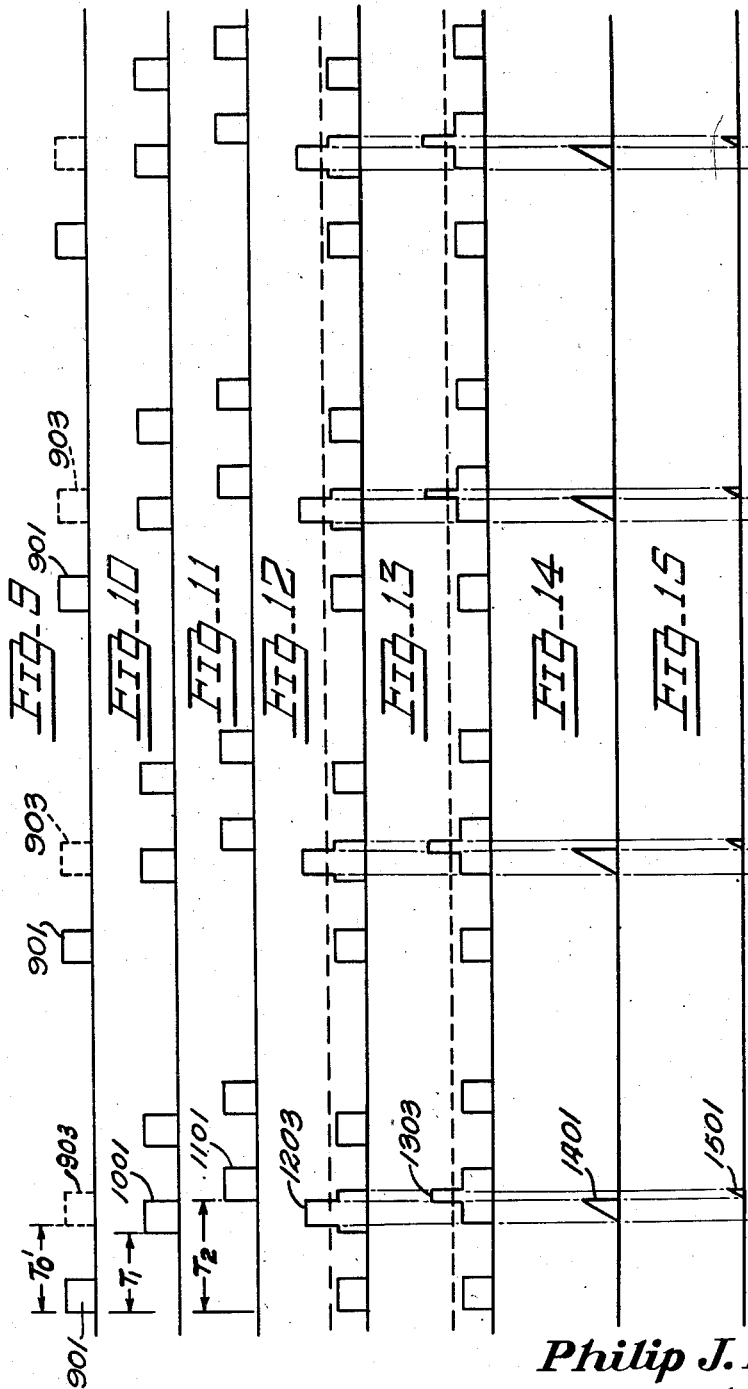

Patented Jan. 30, 1951

2,539,905

UNITED STATES PATENT OFFICE 2,539,905

AIR NAVIGATION

Philip J. Herbst, Princeton, N. J., assignor to Radio Corporation of America, a corporation of Delaware Application December 21, 1946, Serial No. 717,723

4 Claims. (Cl. 343—6)

This invention relates to the automatic control of mobile craft, and more particularly to improvements in the art of guiding an aircraft to follow a predetermined radial course with respect to a ground station.

The principal object of the invention is to provide methods of and means for aircraft control wherein the pulsed signals transmitted by a ground based search radar system are utilized to provide course-deviation information on board the aircraft, in a form suitable for control of an automatic pilot mechanism.

Another object of the invention is to provide in a system of the described type, means for simultaneously controlling substantially any number of aircraft independently of each other without duplication of the ground equipment.

A further object is to provide a system of the described type wherein the course to be followed may be selected either at the ground station or upon the aircraft.

The invention will be described with reference to the accompanying drawings, wherein:

Figure 1 is a schematic block diagram of a system embodying the present invention, Figures 2 through 8 inclusive are oscillograms illustrating various signals appearing in the system of Figure 1 when the aircraft is on the desired course, and Figures 9 through 15 inclusive are oscillograms corresponding to those of Figures 2 through 8 but showing the respective signals when the aircraft is off course.

Refer to Figure 1, which shows the ground based equipment and one aircraft installation. A directive antenna 1 is connected through a duplexing device or "T-R box" 3 to a transmitter 5 and a receiver 7. The receiver 7 is provided with an indicator 9 which may be a cathode ray oscilloscope. The transmitter 5 is provided with a modulator 11 connected to a pulse generator 13.

A parallel path between the pulse generator 13 and the modulator 11 includes an adjustable pulse delay circuit 15. In the present illustration, the circuit 15 is an artificial line comprising lumped inductive and capacitive elements connected to simulate the characteristics of a long transmission line. However, an actual line or other known delay circuit may be substituted. An adjustable tap 17 permits variation of the amount of delay introduced by the circuit 15.

The directive pattern of the antenna 1 is swept in azimuth by means of a motor 19. The sweep may be continuous throughout a complete circle, but is preferable in the present system to oscillate the directive pattern through a relatively small sector centered on the path to be followed by the aircraft. The motor 19 is coupled to the tap 17, so that the delay provided by the circuit 15 varies in accordance with the variation in azimuth of the directive pattern of the antenna 1.

In the operation of the ground station, each pulse produced by the pulse generator 13 goes directly to the modulator 11, causing the transmitter to provide a corresponding pulse of radio frequency energy which is radiated from the antenna 1. Each pulse also goes through the delay circuit 15, arriving at the modulator a short time after the directly applied pulse. The delayed pulse is transmitted like the undelayed pulse. Thus two pulses, spaced apart by an amount depending upon the adjustment of the delay circuit 15, are transmitted in response to each pulse from the generator 13. Since the delay depends upon the azimuth of transmission from the antenna 1, the pulse spacing is characteristic of the bearing.

Each of the aircraft to be controlled carries a set of equipment like that shown on the right side of Figure 1, in addition to a conventional automatic pilot, not shown. A receiver 21, tuned to respond to transmission from the ground station, is connected both directly and through a delay circuit 23 to a mixer 25. The receiver 21 is connected similarly to a second mixer 27, directly and through a delay circuit 29. The output of the mixer 25 is applied to a clipper amplifier 31 which passes only signals above a predetermined amplitude. These are applied to an integrating circuit 33, and thence to a peak detector 35.

The output of the second mixer 27 goes through a similar chain including a clipper 37 and integrator 39 to a peak detector 41. The output circuits of the peak detectors 35 and 41 are connected in opposition to each other, to the turn control input of the automatic pilot. A zero-center galvanometer 43, calibrated like the familiar L-R indicator of conventional radio compasses, may also be connected to the detectors 35 and 41.

The operation of the airborne equipment is as follows:

The receiver 21 receives and detects the pulses transmitted from the ground, but only during periods when the beam of the antenna 1 is directed substantially toward the aircraft. The delay circuits 23 and 29 are adjusted to provide delays which are respectively somewhat less and somewhat greater than the delay which appears between the transmitted pulses when the antenna 1 is directed along the desired flight path.

Referring to Figure 2, the pulses 201 and 203 comprise the signal which is received when the aircraft is on course. The signal repeats at intervals determined by the frequency of the pulse generator 13. The delay $T_0$ of the pulse 203 with respect to the pulse 201 is that which corresponds to the azimuth of the desired flight path. The delay network 23 introduces a delay $T_1$, equal to $T_0$ minus one-half the pulse width. See Figure 3, where the pulse 301 is the pulse 201 delayed by the amount $T_1$, and the pulse 303 is the pulse 203 delayed by $T_1$.

The network 29 delays both pulses by $T_2$, equal to $T_0$ plus one-half the pulse width. The resulting delayed pulses are shown at 401 and 403 respectively in Figure 4.

The pulses 201 and 203 are added in the mixer 25 to the pulses 301 and 303, providing an output of the type shown in Figure 5. This output comprises the first pulse 201, which is so designated in Figure 5, the second delayed pulse 303, and the resultant 501 of the pulses 203 and 301. Since the second received pulse 203 overlaps the first delayed pulse 301 by one-half the pulse width, the resultant 501 is of double amplitude during the overlap, as shown at 503 in Figure 5.

Referring to Figure 6, the output of the mixer 27 is of similar form, including a double amplitude pulse 601 formed by overlapping of the pulses 203 and 401.

The clippers 31 and 37 are set to a level slightly above the single-pulse amplitude, as indicated by the dash lines 505 and 605 in Figures 5 and 6 respectively. The output of the clipper 31 includes only the double amplitude portions 503 of the output of the mixer 25. These are integrated by the integrating circuit 33, providing a train of sawtooth pulses 701, as shown in Figure 7. Since the slope of the front edge of the saw tooth is a constant determined by the design of the integrating circuit, the peak amplitude of the pulses 701 is substantially directly proportional to the width of the double amplitude portions of the pulses 501, and hence to the overlap of the pulses 301 and 401. The detector 35 produces a D.-C. output proportional in magnitude to the peak amplitudes of the pulses 701.

Similarly, the output of the clipper 37 includes only the double amplitude portions 603 of the pulses 601, and the peak detector 41 provides an output proportional in magnitude to the overlap of the pulses 203 and 401. Under the "on-course" conditions represented by Figure 2, this is equal to the output of the detector 35. The resultant current through the meter 43 is zero, and no control voltage is applied to the automatic pilot.

Now suppose the aircraft gets off course, so that the delay between the received pulses is $T_0'$, somewhat less than the delay $T_0$ corresponding to on-course. The first and second pulses are shown in Figure 9 at 901 and 903 respectively. The delays $T_1$ and $T_2$ provided by the networks 23 and 29 are the same as before, so that the first delayed pulse 1001 (Fig. 10) from the network 23 overlaps the second received pulse 903 by more than one-half its width, as can be seen by comparing Figures 9 and 10. On the other hand, the first delayed pulse from the network 29, shown in Figure 11 at 1101, overlaps the second transmitted pulse by less than one-half its width.

Referring to Figure 12, the double amplitude portion 1203 of the output of the mixer 25 is now greater than one-half pulse width. The sawtooth resulting from integration is proportionately higher, as shown at 1401 in Figure 14, than when the aircraft is on-course. As shown in Figure 13 at 1303, the double amplitude portions of the output of the mixer 27 are less than one-half the pulse width. The resulting sawtooth pulses, shown at 1501 in Figure 15, are correspondingly lower in amplitude.

Since the magnitudes of the outputs of the detectors 35 and 41 are proportional to the peak values of the sawtooth pulses 1401 and 1501 respectively, the resultant voltage at the upper terminal of the meter 43 is negative with respect to that at the lower terminal, and the meter is deflected accordingly to indicate the direction and approximate amount of the deviation from the desired course. At the same time, the automatic pilot is energized to steer the craft to the proper course. Deviation to the other side of the course will result in operation similar to that described, except that the detector 41 will provide more output than the detector 35, causing opposite deflection of the meter 43 and opposite operation of the automatic pilot.

It will be evident that any other aircraft within the sector scanned by the antenna 1, and carrying equipment similar to that shown in Figure 1, will be controlled as described. The bearing of the flight path from the ground station may be controlled on the aircraft by increasing or decreasing the delays of the networks 23 and 29 by equal amounts, to provide equal overlaps in the two mixers at the desired azimuth. Similarly, the flight path may be changed at the ground station by changing the position of the arm 17 with respect to the antenna 1, or by adding or removing sections of the delay network 15.

The described system may be duplicated, using a vertically scanning antenna to provide glide path control in addition to the left-right control, for automatic landing of aircraft.

I claim as my invention:

1. In an aircraft control system, a ground station including a radio transmitter, a beam-forming antenna connected thereto, and means cyclically varying the direction of the beam formed by said antenna, a pulse generator, a modulator for said transmitter connected directly to said pulse generator, a further connection from said pulse generator to said modulator including a variable pulse delay circuit, and means varying the delay introduced by said circuit in accordance with said variation in direction of said beam, whereby said ground station transmits double pulses spaced according to direction from said station; an aircraft station including a receiver responsive to the signals transmitted from said ground station, two pulse delay networks connected to said receiver and providing delays respectively greater and less than the pulse spacing corresponding to the direction of a selected course from said ground station, two mixers, each connected to one of said pulse delay networks and directly to said receiver to provide outputs corresponding respectively to the sum of the pulses as received by said receiver and as delayed by said respective delay circuits, said outputs comprising pulses of one amplitude when said received and delayed pulses are separated in time and including a pulse of higher amplitude when one of said delayed pulses coincides with one of said received pulses, peak clippers connected to said mixers to pass only said higher amplitude pulses from said mixers, and means differentially responsive to the durations of said higher amplitude pulses from said respective clippers to steer said craft.

2. An aircraft control system including a ground station comprising a pulse radar system scanning at least a sector including a course to be followed by an aircraft, said radar system including means for providing substantially evenly spaced pulses, and further means providing a pulse following each of said first-mentioned pulses by an interval which varies in accordance with the variation in the direction of transmission of said radar system; and an aircraft station including a receiver responsive to the signals transmitted from said radar system to provide an output comprising pairs of pulses spaced according to the direction of said aircraft station from said ground station, differential delay means responsive to said received pulses, separate mixing means each responsive to said received pulses and to signals derived from different ones of said delay means, and pulse interval timer means responsive to signals from said mixer means to control the direction of flight of said aircraft.

3. A system for automatically controlling a mobile craft to follow a predetermined course, including at a reference location a ground station comprising means for transmitting a radio signal in the form of a beam, means cyclically varying the direction of transmission of said beam, and means cyclically modulating said signal with pairs of pulses, the spacing between the pulses of each pair being a predetermined function of the contemporaneous direction of said beam; a station on said mobile craft including means for receiving said radio signal when said beam is directed toward said craft, differential delay means responsive to said received signals, separate mixing means each responsive to said received signals and to signals derived from different ones of said delay means, and means responsive to signals from said mixer means and hence to the spacing between the pairs of pulses on said received signal to steer said craft to and along said course.

4. For use in an aircraft control system and responsive to a ground station including a radio transmitter, a beam-forming antenna connected thereto, and means cyclically varying the direction of the beam formed by said antenna, a pulse generator, a modulator for said transmitter connected directly to said pulse generator, a further connection from said pulse generator to said modulator including a variable pulse delay circuit, and means varying the delay introduced by said circuit in accordance with said variation in direction of said beam, whereby said ground station transmits double pulses spaced according to direction from said station; the improvement comprising an aircraft station including a receiver responsive to the signals transmitted from said ground station, two pulse delay networks connected to said receiver and providing delays respectively greater and less than the pulse spacing corresponding to the direction of a selected course from said ground station, two mixers, each connected to one of said pulse delay networks and directly to said receiver to provide outputs corresponding respectively to the sum of the pulses as received by said receiver and as delayed by said respective delay circuits, said outputs comprising pulses of one amplitude when said received and delayed pulses are separated in time and including a pulse of higher amplitude when one of said delayed pulses coincides with one of said received pulses; peak clippers connected to said mixers to pass only said higher amplitude pulses from said mixers, and means differentially responsive to the durations of said higher amplitude pulses from said respective clippers to steer said craft.

PHILIP J. HERBST.

REFERENCES CITED

The following references are of record in the file of this patent:

UNITED STATES PATENTS

| Number | Name | Date |
|---|---|---|
| 2,165,800 | Koch | July 11, 1937 |
| 2,176,469 | Moueix | Oct. 17, 1939 |
| 2,252,083 | Luck | Aug. 12, 1941 |
| 2,406,468 | Loughlin | Aug. 27, 1946 |
| 2,448,007 | Ayres | Aug. 31, 1948 |
| 2,448,016 | Busignies | Aug. 31, 1948 |
| 2,459,482 | Bond | Jan. 18, 1949 |